(12) United States Patent
Patel

(10) Patent No.: US 7,485,180 B2
(45) Date of Patent: Feb. 3, 2009

(54) PHTHALOCYANINES AND THEIR USE IN INK-JET PRINTERS

(75) Inventor: Prakash Patel, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 11/885,190

(22) PCT Filed: Mar. 13, 2006

(86) PCT No.: PCT/GB2006/000866

§ 371 (c)(1), (2), (4) Date: Aug. 28, 2007

(87) PCT Pub. No.: WO2006/097695

PCT Pub. Date: Sep. 21, 2006

(65) Prior Publication Data

US 2008/0134933 A1 Jun. 12, 2008

(30) Foreign Application Priority Data

Mar. 18, 2005 (GB) .................... 0505730.2

(51) Int. Cl.
*C09D 11/02* (2006.01)
*C09B 47/04* (2006.01)
*B41J 2/01* (2006.01)

(52) U.S. Cl. .................. 106/31.49; 106/31.78; 540/133; 347/100

(58) Field of Classification Search ............. 106/31.49, 106/31.78; 540/133; 347/100
See application file for complete search history.

(56) References Cited

U.S. PATENT DOCUMENTS 3,334,116 A * 8/1967 Bryan, Jr. et al. ........... 540/133
6,444,807 B1 * 9/2002 Wolleb et al. ............... 540/133
7,014,696 B2 * 3/2006 Patel ........................ 106/31.49
7,147,698 B2 * 12/2006 Patel ........................ 106/31.49
7,156,908 B2 * 1/2007 Patel ........................ 106/31.49
7,189,283 B2 * 3/2007 Patel ........................ 106/31.49
7,326,287 B2 * 2/2008 Patel ........................ 106/31.49
2008/0110369 A1 * 5/2008 Mayall et al. ............. 106/31.49

FOREIGN PATENT DOCUMENTS

EP    0 719 847    7/1996
EP    1 364 994    11/2003

* cited by examiner

*Primary Examiner*—Helene Klemanski
(74) *Attorney, Agent, or Firm*—Morgan Lewis Bockius LLP

(57) ABSTRACT

Compounds of Formula (1) and salts thereof:

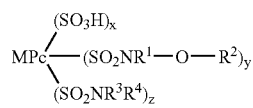

Formula (1)

wherein:
M is 2H, Si, a metal, an oxymetal group, a hydroxymetal group or a halometal group;
Pc represents a phthalocyanine nucleus;
$R^1$ and $R^3$ are H or optionally substituted $C_{1-4}$ alkyl;
$R^2$ and $R^4$ are H or optionally substituted hydrocarbyl;
x is 0.0 to 3.9; y is 0.1 to 4.0; z is 0 to 3.9. Compositions, inks, ink-jet printing processes and cartridges, printed materials and ink jet printing cartridges are also disclosed.

23 Claims, No Drawings

PHTHALOCYANINES AND THEIR USE IN INK-JET PRINTERS

This invention relates to compounds, compositions and inks, to printing processes, to printed materials and to ink-jet printer cartridges.

Ink-jet printing is a non-impact printing technique in which droplets of ink are ejected through a fine nozzle onto a substrate without bringing the nozzle into contact with the substrate. The set of inks used in this technique typically comprise yellow, magenta, cyan and black inks.

With the advent of high-resolution digital cameras and ink-jet printers it is becoming increasingly common for consumers to print off photographs using an ink-jet printer. This avoids the expense and inconvenience of conventional silver halide photography and provides a print quickly and conveniently.

While ink-jet printers have many advantages over other forms of printing and image development there are still technical challenges to be addressed. For example, there are the contradictory requirements of providing ink colorants that are soluble in the ink medium and yet do not run or smudge excessively when printed on paper. The inks need to dry quickly to avoid sheets sticking together after they have been printed, but they should not form a crust over the tiny nozzle used in the printer. Storage stability is also important to avoid particle formation that could block the tiny nozzles used in the printer especially since consumers can keep an ink-jet ink cartridge for several months. Furthermore, and especially important with photographic quality reproductions, the resultant images should not fade rapidly on exposure to light or common oxidising gases such as ozone.

Most cyan colorants used in ink-jet printing are based on phthalocyanines and problems of fading and shade change on exposure to light and contact with ozone are particularly acute with dyes of this class.

The present invention provides compounds of Formula (1) and salts thereof:

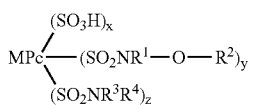

Formula (1)

wherein:
M is 2H, Si, a metal, an oxymetal group, a hydroxymetal group or a halometal group;
Pc represents a phthalocyanine nucleus of formula;

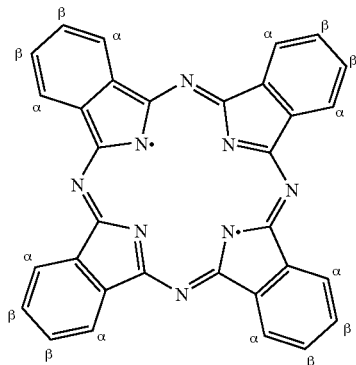

$R^1$ is H or optionally substituted $C_{1-4}$alkyl;
$R^2$ is H or optionally substituted hydrocarbyl;
$R^3$ is H or optionally substituted $C_{1-4}$alkyl;
$R^4$ is H or optionally substituted hydrocarbyl;
x is 0.0 to 3.9;
y is 0.1 to 4.0; and
z is 0 to 3.9.

M is preferably 2Li, 2Na, 2K, Mg, Ca, Ba, Al, Si, Sn, Pb, Rh, Sc, Ti, V, Cr, Mn, Fe, Co, Ni, Cu, Zn, AlX, GaX, InX or $SiX_2$, where in X is OH or Cl, more preferably Sc, Ti, Va, Cr, Mn, Fe, Co, Zn, Ni and Cu, especially Cu or Ni and more especially Cu.

Preferably $R^1$ is H or methyl.
Preferably $R^2$ is H, optionally substituted alkyl or optionally substituted aryl.
More preferably $R^2$ is H, optionally substituted $C_{1-12}$alkyl or optionally substituted phenyl. It is especially preferred that $R^2$ is H or optionally substituted $C_{1-4}$alkyl, more especially H or unsubstituted $C_{1-4}$alkyl, particularly H or methyl and more particularly methyl.
Preferably $R^1$ and $R^2$ are not both H.
Preferably $R^3$ is H or methyl.
Preferably $R^4$ is H, optionally substituted alkyl or optionally substituted aryl.
More preferably $R^4$ is optionally substituted $C_{1-12}$alkyl or optionally substituted aryl. It is especially preferred that $R^4$ is optionally substituted $C_{1-4}$alkyl or optionally substituted phenyl.
Preferably x has a value of 0.1 to 3.9, more preferably 0.3 to 2.
Preferably y has a value of 0.1 to 3.9 more preferably y has a value of 0.2 to 2 and especially of 0.3 to 1.0.
Preferably z has a value of 0.5 to 3.5, more preferably 1 to 3.4 and especially 2.2 to 3.2.
Preferably x+y+z is in the range 2 to 4, more preferably x+y+z is in the range of 3 to 4. It is especially preferred that x+y+z is 4
Preferably x, y and z are all at least 0.1.
The substituents represented by x or y may be a single group or a mixture of 2 or more different groups.
In a preferred embodiment the substituents represented by x, y and z are bound to the phthalocyanine ring only through the β-position on the phthalocyanine ring.
Preferred optional substituents which may be present on $R^1$, $R^2$, $R^3$ and $R^4$ are independently selected from: optionally substituted alkoxy (preferably $C_{1-4}$-alkoxy), optionally substituted aryl (preferably phenyl), optionally substituted aryloxy (preferably phenoxy), optionally substituted heterocyclic, polyalkylene oxide (preferably polyethylene oxide or polypropylene oxide), carboxy, phosphato, sulfo, nitro, cyano, halo, ureido, —$SO_2F$, hydroxy, ester, —$NR^aR^b$, —$COR^a$, —$CONR^aR^b$, —$NHCOR^a$, carboxyester, sulfone, and —$SO_2NR^aR^b$, wherein $R^a$ and $R^b$ are each independently H or optionally substituted alkyl (especially $C_{1-4}$-alkyl). When $R^1$, $R^2$, $R^3$ and $R^4$ comprise an aryl group the aryl may also carry an optionally substituted alkyl (especially $C_{1-4}$-alkyl) substituent. Optional substituents for any of the substituents described for $R^1$, $R^2$, $R^3$ and $R^4$ may be selected from the same list of substituents.

It is especially preferred that $R^4$ carries one or more substituents selected from the group consisting of carboxy, phosphato, sulfo and hydroxy.

The compounds of Formula (1) are also preferably free from fibre reactive groups. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. As examples of fibre reactive groups excluded from the compounds of Formula (1) there may be mentioned aliphatic sulfonyl groups which contain a sulfate ester group in beta-position to the sulfur atom, e.g. beta-sulfato-ethylsulfonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulfonyl- or beta-chloroethylsulfonyl- or beta-sulfatoethyl-sulfonyl-endomethylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluoro-cyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring, for example a triazinyl halide.

Acid or basic groups on the compounds of Formula (1), particularly acid groups, are preferably in the form of a salt. Thus, the Formulae shown herein include the compounds in salt form.

Preferred salts are alkali metal salts, especially lithium, sodium and potassium, ammonium and substituted ammonium salts (including quaternary amines such as $((CH_3)_4N^+)$ and mixtures thereof. Especially preferred are salts with sodium, lithium, ammonia and volatile amines, more especially sodium salts. Compounds of Formula (1) may be converted into a salt using known techniques.

The compounds of Formula (1) may exist in tautomeric forms other than those shown in this specification. These tautomers are included within the scope of the present invention.

The compounds of Formula (1) may be prepared by any method known in the art.

Preferably the compounds of Formula (1) are prepared by condensing a phthalocyanine carrying sulfonyl chloride groups and optionally sulfonic acid groups with compounds of formula $HNR^1OR^2$ and optionally $HNR^3R^4$ wherein $R^1$, $R^2$, $R^3$ and $R^4$ are as hereinbefore defined. Many compounds of formula $HNR^1OR^2$ are commercially available, for example N,O-dimethylhydroxylamine. Compounds of $HNR^3R^4$ are also commercially available, for example ammonia, ethanolamine and taurine, others may be readily prepared by a person of ordinary skill. The condensation is preferably performed in water at a pH above 7. Typically the condensation is performed at a temperature of 30 to 70° C. and the condensation is usually complete in less than 24 hours. The compounds of formula $HNR^1OR^2$ and $HNR^3R^4$ may be used as a mixture or condensed sequentially with the said phthalocyanine compound.

Phthalocyanines carrying sulfonyl chloride groups and optionally sulfonic acid groups may be prepared by chlorosulfonating phthalocyanine using, for example, chlorosulfonic acid and optionally a chlorinating agent (e.g. $POCl_3$, $PCl_5$ or thionylchloride).

When it is required that the substituents represented by x, y and z should be bound to the phthalocyanine ring only through the β-position then preferably sulfonated phthalocyanine is prepared by cyclisation of 4-sulfophthalic acid or an analogue thereof. Preferred analogues of phthalic acid include, phthalonitrile, iminoisoindoline, phthalic anhydride, phthalimide or phthalamide. The cyclisation reaction is carried out in the presence of a suitable source of ammonia (if required), and (if required) a suitable metal salt, for example $CuCl_2$, and a base such as 1,8-diazabicyclo[5.4.0]undec-7-ene (DBU).

It is particularly preferred that the compounds of Formula (1) are obtainable by a process that comprises cyclisation of 4-sulfophthalic acid or an analogue thereof.

The compounds of Formula (1) have attractive, strong cyan shades and are valuable colorants for use in the preparation of ink-jet printing inks. They benefit from a good balance of solubility, storage stability and fastness to water and light.

According to a second aspect of the present invention there is provided a composition comprising a compound of Formula (1) as described in the first aspect of the invention and a liquid medium.

Preferred compositions according to the second aspect of the invention comprise:
(a) from 0.01 to 30 parts of a compound of Formula (1) according to the first aspect of the invention; and
(b) from 70 to 99.99 parts of a liquid medium;

wherein all parts are by weight

Preferably the number of parts of (a)+(b)=100.

The number of parts of component (a) is preferably from 0.1 to 20, more preferably from 0.5 to 15, and especially from 1 to 5 parts. The number of parts of component (b) is preferably from 80 to 99.9, more preferably from 85 to 99.5 and especially from 95 to 99 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

The inks may be incorporated in an ink-jet printer as a high concentration cyan ink, a low concentration cyan ink or both a high concentration and a low concentration ink. In the latter case this can lead to improvements in the resolution and quality of printed images. Thus the present invention also provides a composition (preferably an ink) where component (a) is present in an amount of 2.5 to 7 parts, more preferably 2.5 to 5 parts (a high concentration ink) or component (a) is present in an amount of 0.5 to 2.4 parts, more preferably 0.5 to 1.5 parts (a low concentration ink).

Preferred liquid media include water, a mixture of water and organic solvent and organic solvent free from water. Preferably the liquid medium comprises a mixture of water and organic solvent or organic solvent free from water.

When the liquid medium (b) comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfolane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. No. 4,963,189, U.S. Pat. No. 4,703,113, U.S. Pat. No. 4,626,284 and EP-A-425,150.

When the liquid medium comprises organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the mixture of phthalocyanine compounds in the liquid medium. Examples of polar solvents include $C_{1-4}$-alcohols.

In view of the foregoing preferences it is especially preferred that where the liquid medium is organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the liquid medium is organic solvent free from water it is a mixture of 2 to 5 different organic solvents. This allows a liquid medium to be selected that gives good control over the drying characteristics and storage stability of the ink.

Liquid media comprising organic solvent free from water are particularly useful where fast drying times are required and particularly when printing onto hydrophobic and non-absorbent substrates, for example plastics, metal and glass.

The liquid media may of course contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink to modify the shade and performance properties. Examples of such colorants include C.I. Direct Yellow 86, 132, 142 and 173; C.I. Direct Blue 307; C.I. Food Black 2; C.I. Direct Black 168 and 195; and C.I. Acid Yellow 23.

It is preferred that the composition according to the invention is ink suitable for use in an ink-jet printer. Ink suitable for use in an ink-jet printer is ink which is able to repeatedly fire through an ink-jet printing head without causing blockage of the fine nozzles.

Ink suitable for use in an ink-jet printer preferably has a viscosity of less than 20 cP, more preferably less than 10 cP, especially less than 5 cP, at 25° C.

Ink suitable for use in an ink-jet printer preferably contains less than 500 ppm, more preferably less than 250 ppm, especially less than 100 ppm, more especially less than 10 ppm in total of divalent and trivalent metal ions (other than any divalent and trivalent metal ions bound to a colorant of Formula (1) or any other colourant or additive incorporated in the ink).

Preferably ink suitable for use in an ink-jet printer has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

Preferably ink suitable for use in an ink-jet printer contains less than 500 ppm, more preferably less than 250 ppm, especially less than 100 ppm, more especially less than 10 ppm in total of halide ions.

A third aspect of the invention provides a process for forming an image on a substrate comprising applying ink suitable for use in an ink-jet printer, according to the second aspect of the invention, thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electromechanical actuator connected to a moveable paddle or plunger, for example as described in International Patent Application WO00/48938 and International Patent Application WO00/55089.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred. Photographic quality papers are especially preferred.

A fourth aspect of the present invention provides a material preferably paper, plastic, a textile, metal or glass, more preferably paper, an overhead projector slide or a textile material, especially paper more especially plain, coated or treated papers printed with a compound as described in the first aspect of the invention, a composition according to the second aspect of the invention or by means of a process according to the third aspect of the invention.

It is especially preferred that the printed material of the fourth aspect of the invention is a print on a photographic quality paper printed using a process according to the third aspect of the invention.

A fifth aspect of the present invention provides an ink-jet printer cartridge comprising a chamber and an ink suitable for use in an ink-jet printer wherein the ink is in the chamber and the ink is as defined in the second aspect of the present invention. The cartridge may contain a high concentration ink and a low concentration ink, as described in the second aspect of the invention, in different chambers.

The invention is further illustrated by the following Examples in which all parts and percentages are by weight unless otherwise stated.

EXAMPLE 1

Analysis of Compounds of Formula (1)

Confirmation of the structure of compounds of Formula (1), such as Compound 1 below, is by mass spec. Elemental analysis is used to determine the ratios of x to y+z. When the compound is prepared by cyclisation of 4-sulfophthalic acid then the sum of x plus y and z is 4. If, however, on analysis x plus y and z is not exactly 4 this is thought to be due to the presence of impurities. The presence of these impurities and their effect on the estimated values of x, y and z would be well known to a person skilled in the art who would appreciate that the value of x plus y plus z should not exceed 4 and who would treat the experimentally determined values of x, y and z as indicative of the true ratios of the groups. Also with some compounds according to the present invention it is not possible, using these methods, to discriminate between the different sulfonamide substituents. In these cases x and y are either quoted as a sum of both sulfonamide groups i.e. (y+z) or are quoted as half the total sulfonamide detected i.e. y=1.4 av, in this latter case y and z will always be given as the same value.

Preparation of Compound (1):

Compound (1)

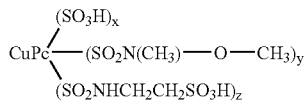

wherein x, y and z are bound only at the β-position: x is 2.1 and y+z is 3.

Stage 1

Potassium 4-sulfophthalic acid (56.8 g), urea (120 g), $CuCl_2$ (6.9 g), ammonium molybdate (1.2 g) and 1,8-diazabicyclo[5.4.0]undec-7-ene (DBU) (7.5 g) were mixed in a reaction vessel. The mixture was then warmed in stages, 130° C./30 minutes, 150° C./30 minutes, 180° C./30 minutes and then to 220° C., over 2 hours and the melt which formed was stirred at 220° C. for a further 2 hours. The solid that formed was extracted 4 times with hot water (4×200 ml) and the extract was filtered to remove insoluble material. The resultant filtrate was stirred at between 60° C.-70° C. and then sufficient NaCl was added to give a 7% salt solution. Stirring was continued and the solid that precipitated was filtered, washed with a 10% salt solution (200 ml) and pulled dry by vacuum. The resultant damp solid (77.6 g) was slurried in acetone, filtered and dried first at room temperature and then at 50° C.

Stage 2

Preparation of the Title Product:

Phosphorous oxychloride (11.92 g) was added dropwise to chlorosulfonic acid (116.5 g) over 5-10 minutes while keeping the temperature below 30° C. When all the $POCl_3$ had been added, the product of stage 1 (22 g) was added portionwise while keeping the reaction temperature below 60° C., this addition took 20-30 minutes. The reaction mixture was stirred at 50-60° C. for 15-20 minutes. The temperature of the reaction mixture was then gradually increased to 138-140° C. over 30 minutes, held at this temperature for 6.5 h and then stirred overnight at room temperature. The mixture was added to water/ice/NaCl/ concentrated HCl (120 ml/120 g/15 g/8 ml). The solid which precipitated was filtered, washed with ice cold acidified 5% salt solution and pulled dry using a vacuum pump (80 g). Half the resultant damp paste (40 g) in water (150 ml) was added to a mixture of taurine (3.75 g), N,O-dimethyhydroxylamine (0.3 g) and water (100 ml) at 0°-5° C. The mixture stirred at 0° to 10° C. (pH>9.5) for 1 hour. The reaction mixture was then stirred at room temperature overnight and then at 40-45° C., pH 9.5 for 1 hour. Temperature increased to 80, pH adjusted to 11.5-12 with NaOH solution and stirred for 2 hours. At the end of this time reaction mixture cooled to room temperature and pH lowered to 9 with HCl solution. Reaction screened and filtrate evaporated to low volume and product precipitated by addition of methanol (350 ml). The solid which precipitated was filtered, dissolved in deionised water, dialysed, filtered and then dried at 70° C. to give 8.6 g of product.

EXAMPLE 2

Preparation of Compound (1) wherein x=2.1 and y+z=2.6

The process of Example 1 was repeated except that in Stage 2, 2.5 g of taurine and 0.61 g of N,O-dimethyhydroxylamine were used. 9.15 g of product was obtained.

EXAMPLE 3

Preparation of Compound (2)

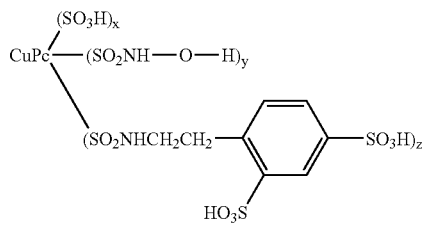

Compound (2)

wherein x, y and z are bound only at the β-position: x is 1.6, y is 0.7 and z is 1.8.

The process of Example 1 was repeated except that in Stage 2, 2'-aminoethylbenzene 2,4 disulphonic acid (prepared as described below), 11.1 g was used in place of taurine and 0.38 g of hydroxylamine hydrochloride was used in place of N,O-dimethyhydroxylamine.

Preparation of 2'-aminoethylbenzene 2,4 disulphonic acid

Phenylethylamine (24.2 g) was added dropwise to 30% oleum (125 ml) at <60° C. (ice cooling). Mixture heated to 100-110° C. for 4 h, cooled and drowned into ice/water (1200 cc) at 10° C. To the solution was added calcium hydroxide (170g) and stirred for 0.5 h. Precipitates were filtered off and the filtrate evaporated to dryness, solid washed with ethanol and dried to give title product as an off white solid (60 g, 80% strength).

EXAMPLE 4

Preparation of Compound (2) wherein x is 2.2, y is 0.8 and z is 1.0. The process of Example 1 was repeated except that in Stage 2, 7.4 g of 2'-aminoethylbenzene 2,4 disulphonic acid was used in place of taurine and 0.76 g of hydroxylamine hydrochloride was used in place of N,O-dimethyhydroxylamine.

Comparative Dye 1

Comparative Dye 1 is C.I. Direct Blue 199 obtained as Pro-JET™ Cyan 1 from Avecia Ltd, as supplied this is of Formula:

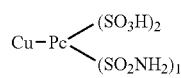

Comparative Dye 2

Comparative Dye 2 is Pro-JET™ Cyan 2 from Avecia Ltd.

Inks

Inks were prepared from the compounds of Examples 1 and 2 and the Comparative Dyes 1 and 2 by dissolving 3 g of the dye in 97 ml of a liquid medium consisting of 5 parts 2-pyrrolidone; 5 parts thiodiethylene glycol; 1 part Surfynol™ 465 and 89 parts water and adjusting the pH to between pH 8 to 9 with sodium hydroxide. Surfynol™ 465 is a surfactant from Air Products.

Ink-jet Printing

Inks, prepared as described above, were filtered through a 0.45 micron nylon filter and then incorporated into empty print cartridges using a syringe.

These inks were then printed onto Xerox 4024 Premium Multipurpose White Paper (Xerox 4024), HP Premium Plus Photo Paper (HPPP) Epson Premium Glossy Photopaper ("SEC PM") and Canon PR101 Photopaper (PR101) at 70% depth.

Print Evaluation

The prints were tested for ozone fastness by exposure to 1 ppm ozone at 40° C., 50% relative humidity, for 24 hrs in a Hampden 903 Ozone cabinet. Fastness of the printed ink to ozone can be judged by the difference in the optical density before and after exposure to ozone.

Light-fastness of the printed image was assessed by fading the printed image in an Atlas Ci5000 Weatherometer for 100 hours and then measuring the change in the optical density.

Optical density measurements are performed using a Gretag spectrolino spectrophotometer set to the following parameters:

| Measuring Geometry | 45°/0° |
| --- | --- |
| Spectral Range | 380-730 nm |
| Spectral Interval | 10 nm |
| Illuminant | D65 |
| Observer | 2° (CIE 1931) |
| Density | Ansi A |
| External Filler | None |

Light and Ozone fastness were assessed by the percentage change in the optical density of the print, where a lower figure indicates higher fastness, and the degree of fade. The degree of fade is expressed as ΔE and a lower figure indicates higher light fastness. ΔE is defined as the overall change in the CIE colour co-ordinates L, a, b of the print and is expressed by the equation $\Delta E=(\Delta L^2+\Delta a^2+\Delta b^2)^{0.5}$.

Results

Light Fastness

TABLE 1

| | % ROD Loss Xerox 4024 | % OD Loss HPPP | % OD Loss PR101 | % OD Loss SEC PM |
| --- | --- | --- | --- | --- |
| Ink 1 | 12 | 23 | 23 | 11 |
| Ink 2 | 9 | 31 | 20 | 9 |
| Comparative Ink 1 | 21 | 41 | 23 | 18 |
| Comparative Ink 2 | 14 | 53 | 55 | 34 |

Ozone Fastness

TABLE 2

| | Optical Density | |
| --- | --- | --- |
| | % OD Loss PR101 | % OD Loss SEC PM |
| Ink 1 | 12 | 11 |
| Ink 2 | 9 | 11 |
| Comparative Ink 1 | 42 | 47 |
| Comparative Ink 2 | 42 | 48 |

TABLE 2-continued

| | Degree of Fade | |
|---|---|---|
| | ΔE PR101 | ΔE SEC PM |
| Ink 1 | 5 | 3 |
| Ink 2 | 4 | 3 |
| Comparative Ink 1 | 27 | 18 |
| Comparative Ink 2 | 21 | 19 |

Clearly compounds according to the present invention display a superior ozone and light fastness compared to two of the market leading cyan dyes currently used in ink-jet printing.

Further Inks

The inks described in Tables A and B may be prepared. Numbers quoted in the second column onwards refer to the number of parts of the relevant ingredient and all parts are by weight. The inks may be applied to paper by any type of ink-jet printer.

The following abbreviations are used in Tables A and B:
PG=propylene glycol
DEG=diethylene glycol
NMP=N-methylpyrrolidone
DMK=dimethylketone
IPA=isopropanol
MeOH=methanol
2P=2-pyrrolidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE A

| Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 1 | 10.0 | 85 | 3 | | 3 | 3 | | | | 5 | 1 | |
| 2 | 2.1 | 91 | | 8 | | | | | | | | 1 |
| 1 | 3.1 | 86 | 5 | | | | | 0.2 | 4 | | | 5 |
| 2 | 1.1 | 81 | | | 9 | | 0.5 | 0.5 | | | 9 | |
| 1 | 2.5 | 60 | 4 | 15 | 3 | 3 | | | 6 | 10 | 5 | 4 |
| 2 | 5 | 65 | | 20 | | | | | 10 | | | |
| 1 | 2.4 | 75 | 5 | 4 | | 5 | | | | 6 | | 5 |
| 2 | 4.1 | 80 | 3 | 5 | 2 | 10 | | 0.3 | | | | |
| 1 | 3.2 | 65 | | 5 | 4 | 6 | | | 5 | 4 | 6 | 5 |
| 1 | 5.1 | 96 | | | | | | | | 4 | | |
| 1 | 10.8 | 90 | 5 | | | | | | 5 | | | |
| 1 | 10.0 | 80 | 2 | 6 | 2 | 5 | | | 1 | | 4 | |
| 1 | 1.8 | 80 | | 5 | | | | | | | 15 | |
| 1 | 2.6 | 84 | | | 11 | | | | | | 5 | |
| 1 | 3.3 | 80 | 2 | | | 10 | | | | 2 | | 6 |
| 1 | 12.0 | 90 | | | | 7 | 0.3 | | 3 | | | |
| 1 | 5.4 | 69 | 2 | 20 | 2 | 1 | | | | | 3 | 3 |
| 1 | 6.0 | 91 | | | 4 | | | | | | 5 | |

TABLE B

| Example | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 2 | 9.0 | 90 | | 5 | | | | | | 1.2 | | 5 |
| 1 | 1.5 | 85 | 5 | 5 | | 0.15 | 5.0 | 0.2 | | | | |
| 2 | 2.5 | 90 | | 6 | 4 | | | | | 0.12 | | |
| 1 | 3.1 | 82 | 4 | 8 | | 0.3 | | | | | | 6 |
| 2 | 0.9 | 85 | | 10 | | | | | 5 | 0.2 | | |
| 1 | 8.0 | 90 | | 5 | 5 | | | 0.3 | | | | |
| 2 | 4.0 | 70 | | 10 | 4 | | | | 1 | | 4 | 11 |
| 1 | 2.2 | 75 | 4 | 10 | 3 | | | | 2 | | 6 | |
| 1 | 10.0 | 91 | | | 6 | | | | | | 3 | |
| 1 | 9.0 | 76 | | 9 | 7 | | 3.0 | | | 0.95 | 5 | |
| 1 | 5.0 | 78 | 5 | 11 | | | | | | | 6 | |
| 1 | 5.4 | 86 | | | 7 | | | | | | 7 | |
| 1 | 2.1 | 70 | 5 | 5 | 5 | 0.1 | 0.2 | 0.1 | 5 | 0.1 | 5 | |
| 1 | 2.0 | 90 | | 10 | | | | | | | | |
| 1 | 2 | 88 | | | | | | 10 | | | | |
| 1 | 5 | 78 | | | 5 | | | 12 | | | 5 | |
| 1 | 8 | 70 | 2 | | 8 | | | 15 | | | 5 | |
| 1 | 10 | 80 | | | | | | | 8 | | 12 | |
| 1 | 10 | 80 | | | 10 | | | | | | | |

The invention claimed is:

1. Compounds of Formula (1) and salts thereof:

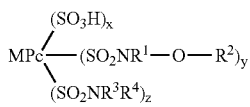

Formula (1)

wherein:
  M is 2H, Si, a metal, an oxymetal group, a hydroxymetal group or a halometal group;
  Pc represents a phthalocyanine nucleus of formula;

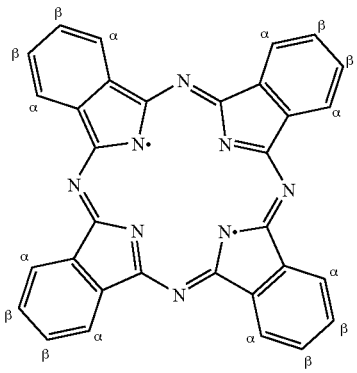

$R^1$ is H or optionally substituted $C_{1-4}$alkyl;
$R^2$ is optionally substituted $C_{1-12}$alkyl or optionally substituted phenyl;
$R^3$ is H or optionally substituted $C_{1-4}$alkyl;
$R^4$ is H or optionally substituted hydrocarbyl;
x is 0.0 to 3.9;
y is 0.1 to 4.0; and
z is 0 to 3.9.

2. Compounds according to claim 1 wherein M is Cu or Ni.

3. Compounds according to claim 2 wherein M is Cu.

4. Compounds according to claim 1 wherein $R^1$ is H or methyl.

5. Compounds according to claim 1 wherein $R^2$ is optionally substituted $C_{1-4}$alkyl.

6. Compounds according to claim 1 wherein $R^2$ is methyl.

7. Compounds comprising compounds of Formula (1) and salts thereof:

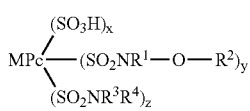

Formula (1)

wherein:
  M is 2H, Si, a metal, an oxymetal group, a hydroxymetal group or a halometal group;
  Pc represents a phthalocyanine nucleus of formula:

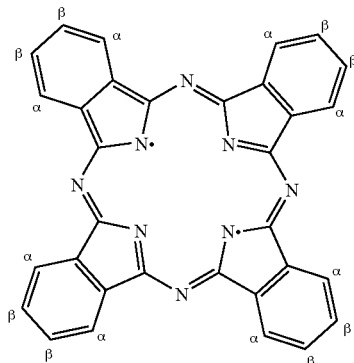

$R^1$ is H or optionally substituted $C_{1-4}$alkyl;
$R^2$ is H or optionally substituted hydrocarbyl;
$R^3$ is H or optionally substituted $C_{1-4}$alkyl;
$R^4$ is H or optionally substituted hydrocarbyl;
x is 0.0 to 3.9;
y is 0.1 to 4.0; and
z is 0 to 3.9
provided that $R^1$ and $R^2$ are not both H.

8. Compounds according to claim 1 wherein $R^3$ is H or methyl.

9. Compounds according to claim 1 wherein $R^4$ is optionally substituted $C_{1-12}$alkyl or optionally substituted aryl.

10. Compounds according to claim 1 wherein $R^4$ is optionally substituted $C_{1-4}$alkyl or optionally substituted phenyl.

11. Compounds according to claim 1 wherein x, y and z are all at least 0.1.

12. Compounds according to claim 1 wherein x has a value of 0.3 to 2.

13. Compounds according to claim 1 wherein y has a value of 0.3 to 1.0.

14. Compounds according to claim 1 wherein z has a value of 1 to 3.4.

15. Compounds according to claim 1 wherein the substituents represented by x, y and z are bound to the phthalocyanine ring only through the β-position on the phthalocyanine ring.

16. Compounds according to claim 1 obtainable by a process that comprises cyclisation of 4-sulfophthalic acid or an analogue thereof.

17. A composition comprising a compound of Formula (1) according to claim 1 and a liquid medium.

18. A composition according to claim 17 which comprises:
  (a) from 0.5 to 15 parts of compounds of Formula (1); and
  (b) from 85 to 99.5 parts of a liquid medium;
wherein all parts are by weight.

19. A composition comprising compounds of Formula (1) and salts thereof:

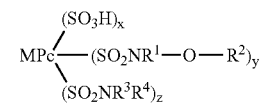

Formula (1)

wherein:
  M is 2H, Si, a metal, an oxymetal group, a hydroxymetal group or a halometal group;
  Pc represents a phthalocyanine nucleus of formula:

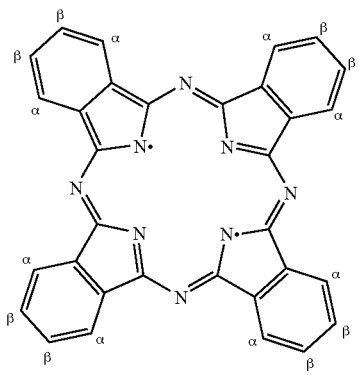

$R^1$ is H or optionally substituted $C_{1-4}$alkyl;
$R^2$ is H or optionally substituted hydrocarbyl;
$R^3$ is H or optionally substituted $C_{1-4}$alkyl;
$R^4$ is H or optionally substituted hydrocarbyl;
x is 0.0 to 3.9;
y is 0.1 to 4.0; and
z is 0 to 3.9
which is ink suitable for use in an ink-jet printer.

20. A process for forming an image on a substrate comprising applying a composition according to claim 19 thereto by means of an ink-jet printer.

21. A material printed with compounds according to claim 1 or claim 7.

22. A photograph printed utilizing a process according to claim 20.

23. An ink-jet printer cartridge comprising a chamber and an ink wherein the ink is in the chamber and the ink is according to claim 19.

* * * * *